United States Patent [19]
Hanks et al.

[11] Patent Number: 5,447,051
[45] Date of Patent: Sep. 5, 1995

[54] METHOD AND APPARATUS FOR TESTING A PIEZOELECTRIC FORCE SENSOR

[75] Inventors: D. Mitchel Hanks, Boise, Id.; Larry S. Metz, Fort Collins, Colo.

[73] Assignee: Hewlett-Packard Company, Palo Alto, Calif.

[21] Appl. No.: 102,597

[22] Filed: Aug. 5, 1993

[51] Int. Cl.⁶ ............................................. G01P 15/08
[52] U.S. Cl. ..................................................... 73/1 D
[58] Field of Search ............... 73/1 D, 2, 1 DV, 865.9, 73/DIG. 4; 180/282; 369/55

[56] References Cited

U.S. PATENT DOCUMENTS

| | | | |
|---|---|---|---|
| 4,851,705 | 7/1989 | Musser et al. | 180/282 |
| 5,004,985 | 4/1991 | Holroyd et al. | 73/1 DV |
| 5,070,843 | 12/1991 | Komurasaki | 73/1 DV |
| 5,166,880 | 11/1992 | Furui | 180/282 |
| 5,282,387 | 2/1994 | Suzuki | 73/517 R |

FOREIGN PATENT DOCUMENTS 2239096  6/1991  United Kingdom ............... 73/1 D

*Primary Examiner*—Raevis
*Attorney, Agent, or Firm*—E. F. Oberheim

[57] ABSTRACT

A test system for a piezoelectric element per se or a piezoelectric element in a physical system, which is subject to forces which deform the piezoelectric element, couples an electrical pulse to the piezoelectric element sufficient to stress the element and induce mechanical ringing upon pulse removal. The ringing electrical signal developed by the piezoelectric element characterizes the functionality of the piezoelectric element. A response circuit which is responsive to the ringing electrical signal provides an electrical signal indicative of the functional condition of the piezoelectric element. The electrical signal is peak detected. The peak detected voltage is compared with a reference voltage to provide an indication of the functionality of the piezoelectric element.

11 Claims, 7 Drawing Sheets

METHOD AND APPARATUS FOR TESTING A PIEZOELECTRIC FORCE SENSOR

CROSS REFERENCE TO RELATED APPLICATION

Patent application of D. Mitchel Hanks, Ser. No. 07/893,303, filed Jun. 4, 1992, entitled, "APPARATUS AND METHOD FOR SHOCK ATTENUATION IN A DISK RECORDING AND/OR REPRODUCTION SYSTEM", assigned to the assignee of this invention.

FIELD OF THE INVENTION

This invention relates generally to force responsive sensors or transducers and to their application in physical systems. More particularly, this invention relates to apparatuses and methods for testing the functionality of the force sensitive element of a piezoelectric transducer as a separate item, as in a bench test, or in situ in the physical system in which the piezoelectric transducer is installed.

BACKGROUND OF THE INVENTION

Piezoelectric Transducers are used in a variety of applications as sensors in physical systems for initiating some type of system activity. In some applications mechanical forces are employed to mechanically strain or deform the piezoelectric element. The piezoelectric element converts the strain to an electrical signal which is a function of the applied force. In other applications an electrical signal which is coupled to the piezoelectric transducer results in a mechanical deformation of the piezoelectric element which is some function of the magnitude of the electrical signal applied thereto.

Piezoelectric transducers are employed as the mechanical force sensor in pressure sensing systems, strain gages, microphones and burglar alarms, for example, and as the electrical actuator in buzzers, speakers, ultrasonic heads, print heads, etc., to name only a few of the many applications. The Piezoelectric effect is known to be the phenomenon of certain materials which convert mechanical stress therein to electricity or which convert an electrical signal coupled thereto to a mechanical strain in the piezoelectric element itself.

An additional application of the piezoelectric effect is in the sensing of acceleration. Here, again, a force is coupled to the piezoelectric element as a function of the acceleration. Accelerometers are made by coupling a mass to a piezoelectric element such that the mass stresses, i.e., strains and deforms the piezoelectrical element when subjected to acceleration. The resulting voltage or electrical charge appearing across the piezoelectrical element is carefully amplified and can be used as an acceleration proportional voltage. The use of piezoelectric materials in sensing of acceleration is well known and understood.

It is desirable in many applications to test the piezoelectric element to be certain that it is functional before installation in a physical system and also to be able to test the element from time to time after installation in the physical system. Examples of such physical systems are seen in FIGS. 1, 2 and 3 which represent typical applications of piezoelectric transducers.

FIG. 1, in diagrammatic form, fragmentarily illustrates a sheet steel rolling mill involving the two final stages of the mill, represented in the roll stands RS1, RS2, and a take-up reel TR. The roll stands and the take-up reel are driven by respective motors M1, M2 and M3. The steel sheet exiting a roll stand is moving faster than that portion entering the roll stand, so successive stages of roll stands must be precisely speed regulated to maintain proper sheet tension to avoid sheet buckling or sheet breaking. For this reason a transducer 7 is employed, in what is sometimes called a tensionometer control system, to respond to the variable applied force $F_a$ as a result of sheet tension. As seen in FIG. 1, the transducers 7 have their outputs coupled to the respective control system sections which respectively control the windings W for the respective motors. While not shown, provision is made to simultaneously speed regulate the motors so that they operate close to the required speed. The fine speed control is provided by the piezoelectric transducer as a function of strip tension. In this application of the transducer, the piezoelectric element is directly strained or deformed by the tension in the sheet, resulting in the force $F_a$ coupled thereto.

As further background of this invention, FIG. 2 illustrates the application of a piezoelectric element in an accelerometer in a disk drive. The disk drive illustrated in FIG. 2 is a rotary actuator type of disk drive comprising a disk 3 and a rotary actuator 5 which mounts a transducer such as a magnetic head 5d. An actuator motor M4 having a winding W powers the actuator arm 5 to move the magnetic head 5d to different radial locations across the surface of the disk 3. Control of the excitation of the winding W to achieve such magnetic head positioning is under the control of a control system 10 which responds to requests from a host computer 15 by translating requests for data or, for writing data to tracks and track sectors on the disk. Portable applications of disk drives in personal computers, such as the popular "palm top" and "lap top" personal computers, present an abusive environment for the disk drive, where bumping and even dropping of the personal computer during operation can result in shock forces displacing the magnetic head from the track it may be following in retrieving data or writing data. In a rotary actuator type of drive the transducer is in the form of a rotary accelerometer 7 to respond to angular acceleration resulting from such shock coupling. The output of rotary accelerometer 7 is coupled to the control system to excite the winding W in a sense and in a degree which produces a torque which opposes and ideally balances the component of torque due to shock acting about the pivot of the rotary actuator 5.

A further application of a piezoelectric accelerometer, in this case a linear accelerometer, is found in an air bag deployment system application in a motor vehicle. Such an application is seen in FIG. 3. Here, the accelerometer 7 is coupled as input to a control system 10, forming part of the air bag deployment system, having an output which controls a valve 12b in an air bag inflater 12. The air bag inflater comprises an air supply 12a which is coupled by the valve 12b to an air bag 12c. In these installations, the threshold of response of the accelerometer is usually set at about 50 gs. Thus, in a crash situation exceeding the accelerometer threshold, the accelerometer 7 provides the signal which is the stimulus for operating the valve 12b, to quickly inflate the air bag.

In all such applications, it is desirable to know that the piezoelectric element is functional for its intended purpose, from the point of view of its functionality prior to installation in the system and as to its functionality after installation and use, or intended use, in the system. This is particularly important in the vehicle air bag system where testing of the accelerometer without deploying the bag is a desirable precaution.

SUMMARY OF THE INVENTION

This invention proposes a way to electrically test the functionality of a piezoelectric sensor without using a mechanical exciter. Typically, a piezoelectric sensor like that used to sense acceleration, for example, has a very high mechanical Q and will ring with a lightly damped oscillation for a period of time after an electrical stimulation coupled to the piezoelectric sensor has been removed. Since the piezoelectric element can be deformed by applying a voltage across it, its piezoelectric response can be checked by applying a voltage pulse, causing the element to mechanically ring upon removal of the voltage pulse, which ringing, in turn, generates across the element a ringing electrical signal that can be sensed and used to characterize the functionality of the element. The magnitude of the mechanical vibration or ringing caused by the voltage pulse and the magnitude of the voltage caused by mechanical ringing, are both a function of a coupling factor, K, which is constant for a given type of piezoelectric material. The electrical response due to this mechanical ringing characterizes the functionality of the piezoelectric element and is usable as an indication as to whether or not the piezoelectric element is functional for its intended purpose.

Thus, according to an elementary aspect of this invention, a system is provided for testing a piezoelectric element which embodies a test circuit which is coupled to the piezoelectric element for applying a momentary electric signal thereto to strain the element. Upon termination of the electrical signal the piezoelectric element mechanically rings and produces a ringing electrical signal. A response circuit, also coupled to the piezoelectric element, is responsive to the ringing electrical signal. The response circuit produces a response indicative of the functionality of the piezoelectric element.

According to a further aspect of this invention, a test system is provided for testing a piezoelectric transducer in situ in a physical system of which it is a functional part. The piezoelectric transducer has a piezoelectric element which is coupled in the physical system for applying its electrical output as a control function in the physical system for the purpose of controlling some activity of the system. Provision is made for testing the piezoelectric element in situ. To this end a test signal circuit is coupled to the piezoelectric element for momentarily energizing and thereby mechanically stressing the piezoelectric element causing that element to mechanically ring and produce a ringing electrical signal which characterizes the functional condition of the piezoelectric element. A response circuit in the physical system, also coupled to the piezoelectric element, is responsive to the ringing electrical signal and produces an electrical signal which characterizes the functionality of the piezoelectric element. In such testing, provision is made, if and as required, to isolate the physical system from the piezoelectric element.

BRIEF DESCRIPTION OF THE DRAWINGS

The invention will be better understood by reference to the following specification when considered in conjunction with the accompanying drawings, in which.

DESCRIPTION OF THE PREFERRED EMBODIMENTS

Figure 4:
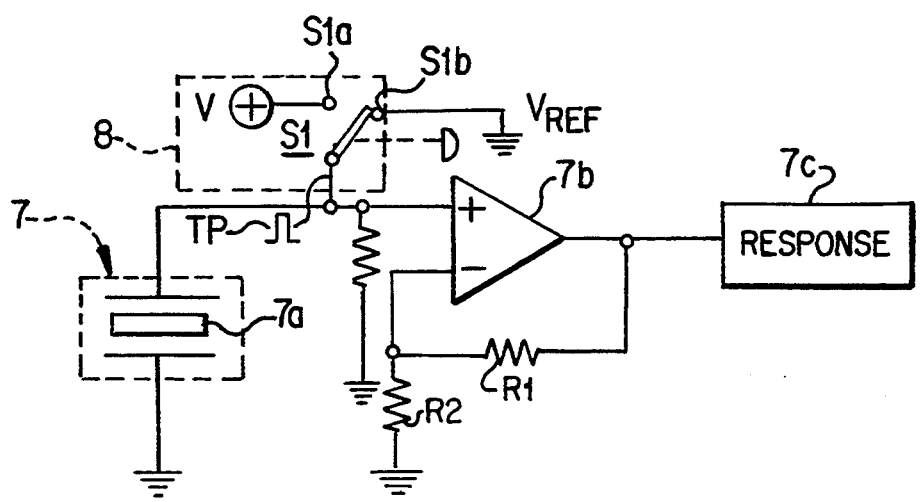
FIGS. 4 and 5 show differing implementations of arrangements for testing piezoelectric elements according to this invention.

Referring now to FIG. 4, a test circuit for testing a piezoelectric transducer 7 in a voltage mode configuration is illustrated. The circuit comprises a differential type of amplifier 7b having a positive input terminal biased by a reference voltage $V_{ref}$ and a negative input terminal which is grounded through a resistor R2, or alternatively coupled to a second reference voltage $V_{ref}$ different from ground. Negative feedback is provided by a resistor R1. A response circuit 7c is coupled to the output of the amplifier 7b. A piezoelectric transducer 7 has a piezoelectric element 7a, the upper electrode of which is connected as input to the positive input terminal of the differential amplifier 7b. The other electrode of the piezoelectric element is grounded. A test pulse circuit 8 comprises a switch S1, here shown as being push button operated. Switch S1 has a switch terminal S1a and a switch terminal S1b, switch terminal S1a, when contacted connects a positive voltage V into the positive input circuit of the amplifier 7b. Switch terminal S1b when contacted couples $V_{ref}$, shown as ground, to discharge the input circuit. Preferably the input circuit is discharged while the piezoelectric element is still flexed. For this reason the switch S1 is preferably a make at break or make just before break switch, such as the electronic switches of FIG. 6A and 6B. With terminal S1a connected this circuit configuration represents the voltage mode test configuration.

Normally the piezoelectric element 7a has the voltage $V_{ref}$ at the positive input terminal of the amplifier across its electrodes. This is the situation in which the switch S1 is closed on terminal S1b. In this latter circuit configuration, one electrode of the piezoelectric element 7a is grounded while the other side is biased to the operating point of the amplifier input as shown. To initiate ringing in the transducer, terminal S1a is momentarily contacted placing V+ across the piezoelectric element, which immediately before had $V_{ref}$ across it. This sudden change in voltage across the element, represented in the test pulse TP, causes it to be stressed resulting in strain and deformation. When terminal S1b is engaged, V+ is removed and the input circuit is discharged while the piezoelectric element is still stressed. When the voltage V+, i.e., the test pulse TP, is removed, lightly damped mechanical ringing of the piezoelectric element 7a begins. This mechanical ringing develops an electrical ringing signal in the input circuit which is amplified by the amplifier 7b, producing a signal at the output of the amplifier having a damped oscillation characteristic, characteristically as illustrated, see FIG. 6A. This signal has a peak value proportional to the coupling factor and sensitivity of the piezoelectric element 7a. If the bandwidth of the amplifier 7b is much higher than the reciprocal of the damping time constant of the piezoelectric element 7a, the ringing electric signal, from the mechanical ringing of the piezoelectric element, will be seen at the output of the amplifier 7b for an interval after the amplifier has recovered from the momentary voltage impulse, V+, used to excite the sensor piezoelectric element.

This voltage is coupled into a response circuit 7c. In this response circuit, as will be discussed at a later point, a ringing electric signal can be calibrated to characterize the sensitivity of the accelerometer by comparing the magnitude of the ringing voltage to that of a sensor of known sensitivity and similar characteristics.

This test circuit and method can be elaborated upon by employing additional switches to isolate the amplifier input from the voltage impulse while contact 5a is engaged. Thus the amplifier 7b would not be subject to the test voltage V+ and, while the amplifier recovery time from the time of removal of the V+ voltage is short, the use of an isolation switch will obviate any loss in response to the ringing electrical signal of the piezoelectric element at the time the V+ voltage is removed. This also has the advantage of eliminating any possibility of a response of the amplifier to the V+ voltage appearing in the response circuit.

Figure 5:
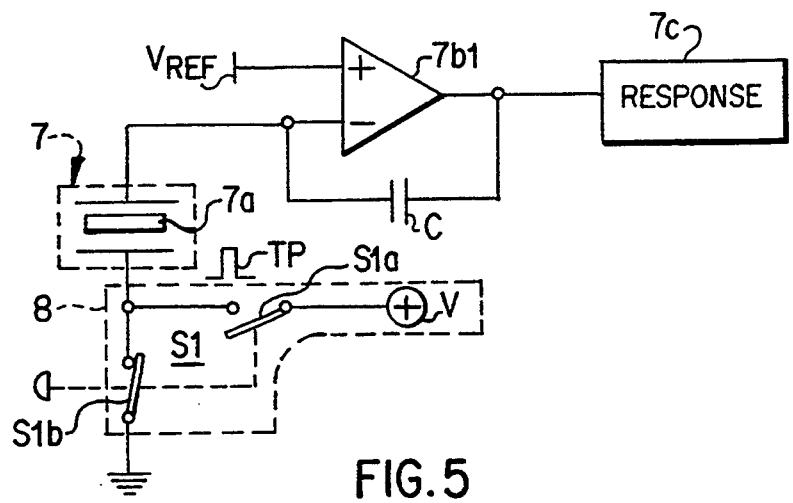

As seen in FIG. 5 the piezoelectric transducer 7 also may be coupled and operated in what is known as a charge mode where instead of amplifying the voltage across the piezoelectric element 7a, the charge from the element is integrated. In the circuit of FIG. 5, a charge coupled amplifier 7b1 has its positive input terminal connected to a reference voltage $V_{ref}$. The piezoelectric element 7a of the transducer 7 is coupled to the negative input terminal of this amplifier 7b1. The negative input terminal is also provided with a feedback loop including a capacitor C. A switch array S1, in a test pulse circuit 8, comprises a normally closed piezoelectric element ground switch S1b and a normally open test signal switch S1a which when closed couples the test voltage V+ to the piezoelectric element 7a. The switch elements S1a and S1b (here shown as separate switches) are mechanically ganged and, as illustrated, are operated by a push button to close the switch S1a and open the switch S1b. Thus, as in the case of FIG. 4, the test voltage V+, represented in a test pulse TP resulting from only momentary operation of the push button, is coupled across the piezoelectric element 7a. The ringing signal, initiated upon termination of the test pulse TP, is amplified and coupled to the response circuit 7c by the amplifier 7b1. Charge mode operation of piezoelectric elements is common and is well understood. Since the signal side of the piezoelectric element 7a is always a virtual ground, the test pulse TP can be applied to the other side of the piezoelectric element, as described. Operation of the switch S1 places a different voltage (the voltage V+) across the piezoelectric element 7a than is normally there. This excites the piezoelectric element 7a mechanically so that when the switches S1a and S1b return to their normal positions the ringing electrical signal can be sensed at the output of the charge coupled amplifier 7b1.

While mechanical switching has been illustrated in the circuits of FIGS. 4 and 5, it will be appreciated that such mechanical switching is utilized in the interest of simplifying the circuit so that attention may be focused upon the organizational concept rather than upon switching details. Reference is also made to the fact that isolation switching may be useful in isolating parts of the circuits, i.e., the amplifier 7b1, to obviate response, during test, to signal activity other than that of the ringing electrical signal.

Figure 6A:
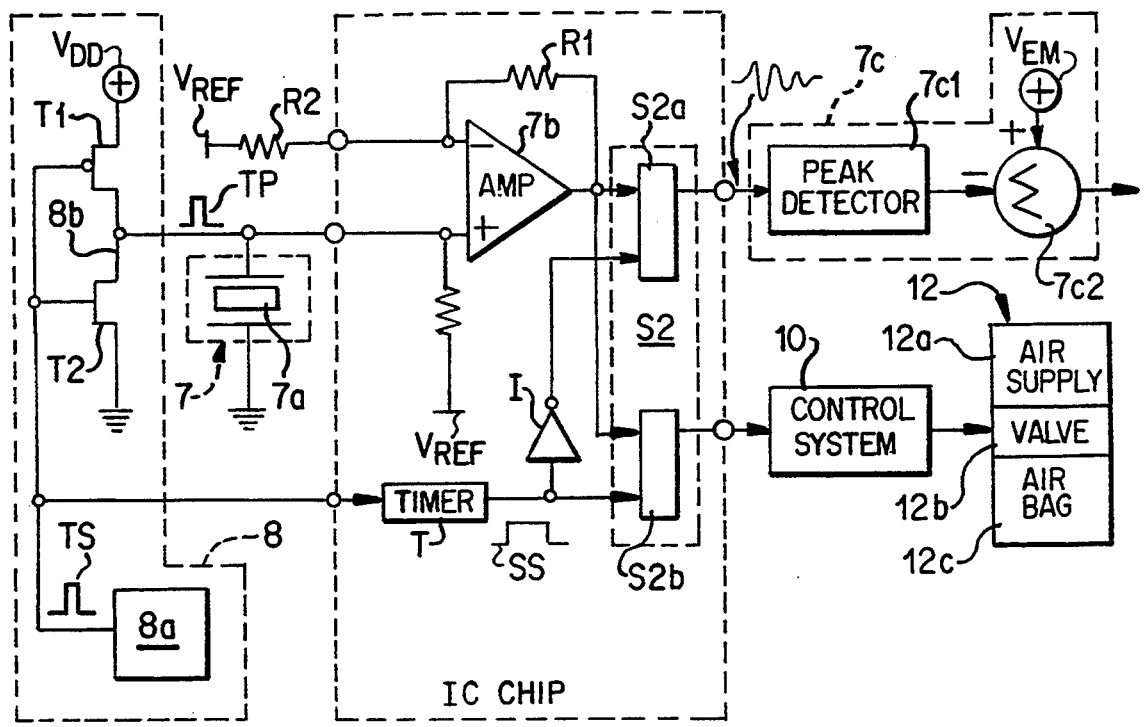
FIG. 6A is a diagrammatic illustration of that aspect of the invention of FIG. 4 in its application in testing a piezoelectric element in a vehicle air bag deployment system.

FIG. 6A enlarges upon the details of the circuit of FIG. 4, for example, in its application in a vehicle air bag deployment system to provide in situ testing of the piezoelectric element for functionality without initiating air bag deployment. In FIG. 6A, the test circuit per se is implemented upon an IC chip which comprises the amplifier 7b of FIG. 4. The test pulse circuit 8 comprises a test signal source 8a for producing a test signal pulse TS as illustrated. A series connected transistor pair T1, T2 is connected between a positive voltage supply $V_{dd}$ and ground. The test signal TS is coupled directly to the base circuit of the transistor T2 and the inverted test signal is coupled to the base circuit of the transistor T1. The transistors are conductive in the lower voltage state of the signals coupled thereto. Thus, normally the transistor T2 is conducting and transistor T1 is non-conducting, which electrical conductive figuration of the transistors couples the piezoelectric element 7a of the transducer 7 to ground.

While the ringing electrical signal differs characteristically from that resulting from a crash impact response of the piezoelectric element 7a, when configured as an accelerometer in an air bag deployment system in a vehicle, provision is made in FIG. 6A to isolate the air bag deployment system, comprising the control system 10 and the air bag inflater 12, from the test system to obviate inadvertent deployment of the air bag 12c. To this end, a switching circuit S2, comprising individual switching elements S2a and S2b, is provided. These switching elements are shown only in block form and may represent mechanical switches, may represent transistor switches or may represent diode gating circuits, or other switch, according to design convenience. All such circuits being well known, specific illustration is not made. The switching elements S2a and S2b are controlled by a timer circuit T. The timer circuit T is operated by the test signal TS which initiates the timing. The timer T produces a switch signal SS which is coupled directly to the switch element S2b and which is inverted by an inverted amplifier I and coupled to the switch element S2a. In its low voltage state, the switch signal SS enables the switch element S2b and in its high voltage state disables the switch element S2b. Inversion of the switch signal SS by the inverter amplifier I thus enables the switch element S2a in the interval of existence of the switch signal SS. By this expedient, during testing of the piezoelectric element 7a, the test response circuit 7c is coupled to the output of the amplifier 7b and the air bag deployment system is decoupled from the output of the amplifier 7b, thereby isolating the air bag deployment system from the test function.

The test response circuit 7c comprises a peak detector circuit 7c1 the output of which is coupled to the negative input terminal of a comparator circuit 7c2. A voltage $V_{em}$, a positive voltage, is coupled to the positive input terminal of the comparator 7c2. The voltage $V_{em}$, may be empirically measured, and represents a voltage which characterizes the functionality or goodness of piezoelectric elements of the type of the piezoelectric element 7a, as characterized by the ringing electrical signal, here depicted as a damped oscillating signal coupled to the input of the peak detector. This voltage, $V_{em}$, which is herein referred as a nominal peak voltage, characterizes the functionality of a piezoelectric element, of the type being tested, known to have acceptable functional properties for the specific application, as, for example, the application in an accelerometer in a vehicle air bag deployment system.

In use, with the transistor T2 conducting, the voltage $V_{ref}$ at the positive input terminal of the amplifier 7b, appears across the piezoelectric element 7a in the accelerometer 7. Thus the accelerometer circuit is "armed". In this circumstance, the output of the timer T is in the lower of its two voltage states which enables the switch S2b and disables the switch S2a. In this condition of the circuit, the application of an acceleration force to the accelerometer 7, in excess of the threshold of acceleration for which the accelerometer 7 is designed, results in an electrical output of the piezoelectric element 7a, coupled via the amplifier 7b and the switch S2b to the control system 10, to trigger the valve 12b, at which time the air supply 12a is coupled to the air bag 12c to quickly deploy or inflate the air bag.

When it is decided to test the piezoelectric element 7a of the accelerometer 7, the test signal source is activated to produce a test signal TS. The test signal TS momentarily switches off the transistor T2 and switches on the transistor T1. At the same time, the switching signal SS is initiated to disable the switch element S2b and enable the switch element S2a. This couples the voltage $V_{dd}$ across the piezoelectric element 7a at the positive input of the differential amplifier 7b. With termination of the test pulse TP generated by the transistor circuit 8b in the presence of the test signal TS, the ringing electrical signal of the piezoelectric elements 7a is coupled via the amplifier 7b and the switch element S2a as input to the peak detector of the test response circuit 7c, where the output of the peak detector is compared with the nominal voltage at the comparator circuit 7C2. Throughout the period of the switch signal SS, which period or interval is preferably greater than the life cycle of the ringing electrical signal, the air bag deployment system is isolated from the test signal circuit. With termination of the switch signal SS, the circuit is returned to "armed" condition.

Figure 6B:
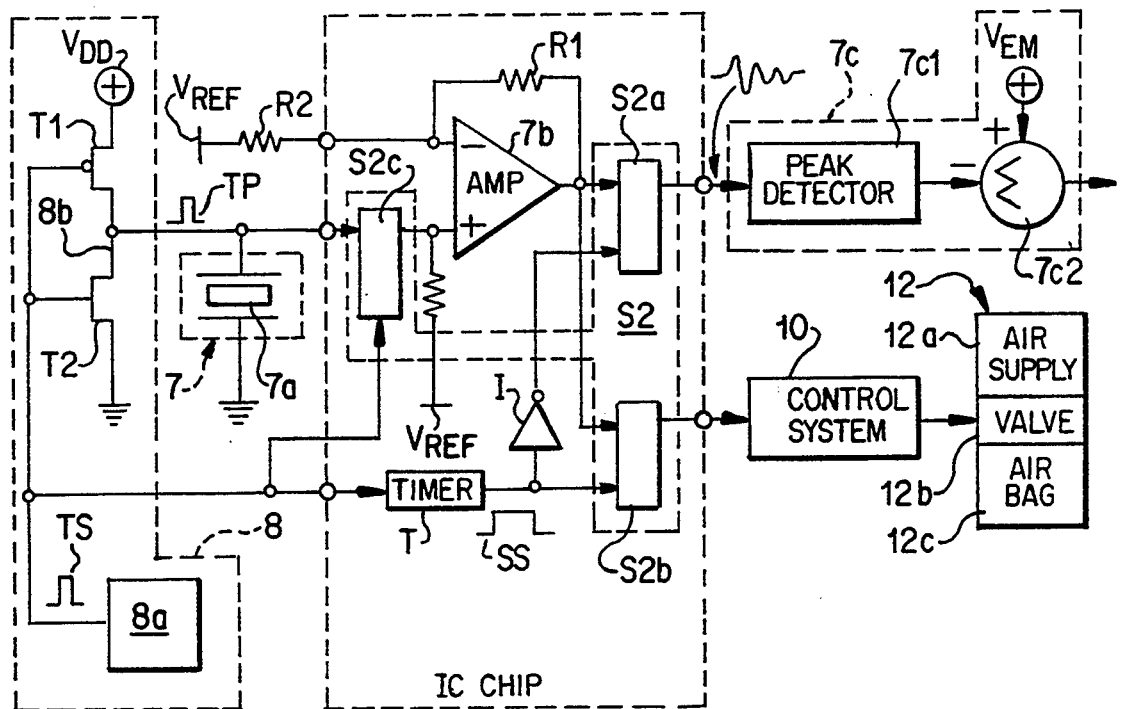
FIG. 6B is a modification of the invention illustrated in FIG. 6A.

As earlier noted, it may be desirable to isolate the amplifier 7b from exposure to the application of the test voltage to the piezoelectric element 7a. The test signal TS also provides a way to achieve such isolation. As seen in FIG. 6b, a switch element S2c forming part of the switch circuit S2 is coupled in the positive input circuit of the amplifier 7b. Like the other switch elements, this switch element S2c is also disabled by the test signal TS in the higher of its two voltage states. Thus, during the existence of the test pulse TP, initiated and controlled by the test signal TS via the transistor switch 8b, the switch element S2c is disabled and the circuit at the input of the amplifier 7b from the piezoelectric element 7a is open. In this circumstance, the test pulse TP is isolated from the amplifier 7b which also prevents its appearance in the test response circuits 7c. As in the case of FIG. 6A, the switch signal SS of the timer T spans the life cycle of the ringing electrical signal and, at the end of the interval of this switch signal SS, the air bag deployment system of the vehicle is again "armed".

Figure 7:
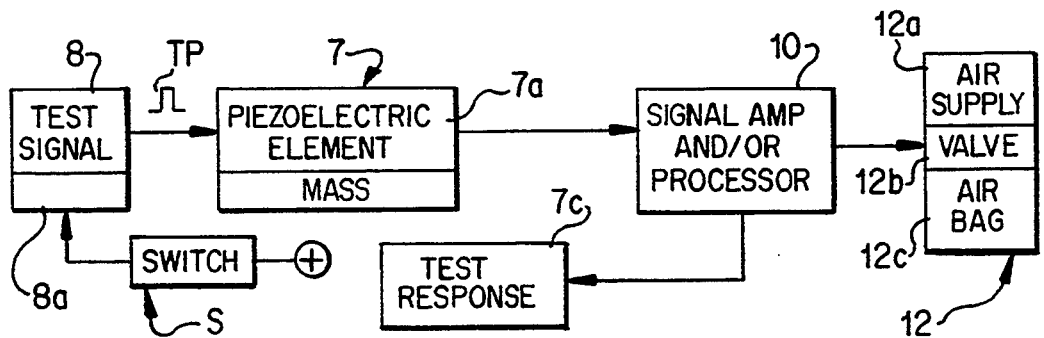
FIGS. 7 and 8 are higher level block diagram developments of vehicle air bag deployment systems illustrating differing approaches to development of the test signals for the piezoelectric element.
Figure 8:
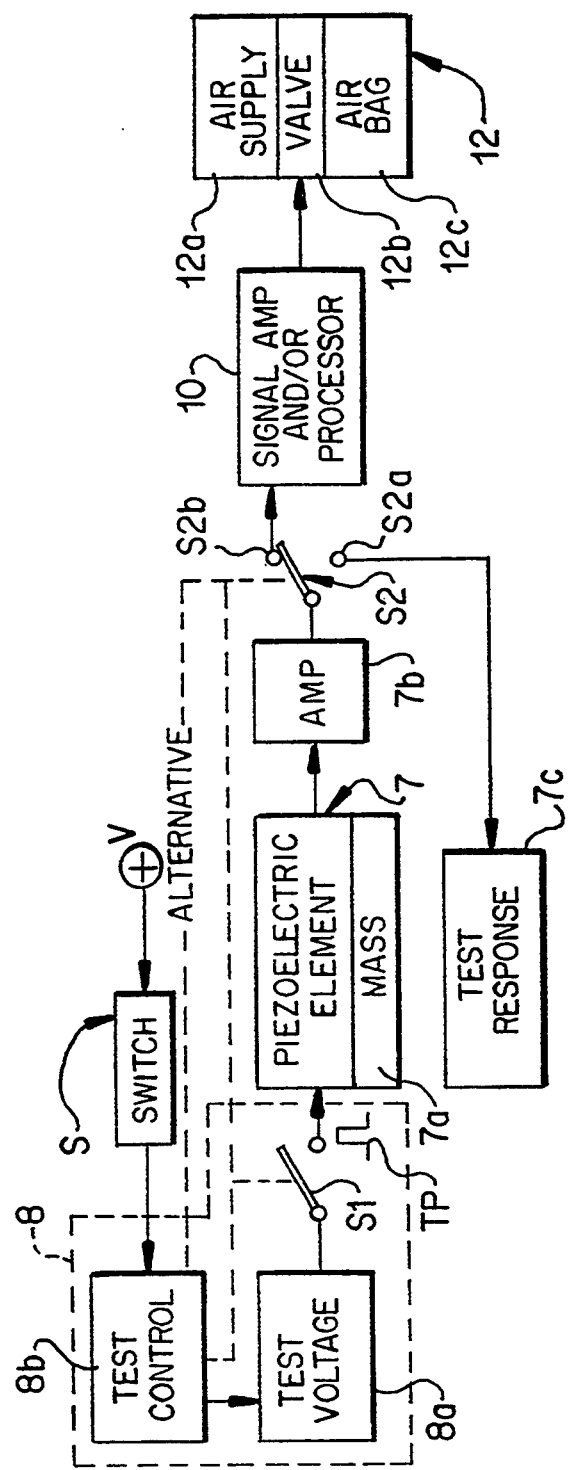

In a vehicle air bag deployment system, it is desirable that the operator of the vehicle is aware of the functionality of the air bag deployment system. FIGS. 7 and 8, which follow, address this situation and employ block diagrams to simplify the illustration and to illustrate how, with each use of the vehicle, the driver may initiate a quick test of the piezoelectric element in the system to determine its functionality.

In FIG. 7, a switch S is provided to control the test signal circuit 8a to initiate the production of the test signal. The switch S may be the ignition switch in the vehicle, or may be a separate switch in the vehicle which can be used, whether the ignition switch is in its on position or not, to couple a positive voltage to the test circuit to cause production of the test signal TS from which the test pulse TP follows. The test response circuit may have the output of the comparator circuit 7c2 connected to a lamp or other instrumentality, conspicuously displayed in the instrument panel region, or other convenient location, which provides an indication that the test of the piezoelectric element was or was not satisfactory. If the test is to initiated by the ignition switch it may be made with the ignition switch in the "on" position, but not in the engine cranking position so that the test may not be disrupted by cranking of the engine. Otherwise, the switch S may represent a separate switch, conveniently located on the steering column or on the instrument panel, for applying the test pulse to the test signal circuit 8a, with or without the ignition switch in the "on" position.

FIG. 8 illustrates two approaches to the production of the test pulse TP. If the test voltage source 8 produces a test signal TS of the pulse type seen in FIG. 6A or 6B, for example, one mode of operation of the switches S1 and S2 is required. If, on the other hand, the test voltage source 8 is a supply of fixed positive voltage, then a different mode of operation of the switches S1 and S2 is required.

Assuming a pulse type of test signal TS of the type of FIG. 6A, for example, the switches S1 and S2 may be operated together by a test control circuit 8b. Thus, as seen, the switches may be ganged together, as indicated by the dotted lines. Upon operation of the switch S to apply voltage to the test control circuit 8b, the switches S1 and S2 are simultaneously operated. Switch S1 closes to couple the test voltage circuit 8a to the piezoelectric element and the switch S2 connects the amplifier 7b to the switch terminal S2a to couple the electrical ringing signal to the test response circuit 7c and to disconnect the air bag deployment system. The test control circuit 8b produces an output coupled to the test voltage circuit 8a initiating production of a test signal TS from which the test pulse TP is produced. Thus the test cycle is initiated.

If, on the other hand, the test voltage circuit is a supply of fixed positive voltage, for example, the switches S1 and S2 may not be operated together in which case the alternative connection, indicated by the dot-dash line for the switch S2 is necessary. Thus, upon operation of the switch S, the test control circuit 8b operates the switch S1 moving it to closed position and, at the same time, the alternative connection operates the switch S2 to couple the output of the amplifier 7b to the terminal S2a to couple the electrical ringing signal to the test response circuit 7c. However, to generate the test pulse TP it is necessary for the switch S1 to open. The test control circuit operates the switch S1 moving it to open position, but in this circumstance via the alternative connection to the switch S2 the switch S2 remains connected to the terminal S2a. Thus throughout the ringing electrical signal interval switch S2a remains closed and at the end of a timed interval, as described in FIG. 6A, the switch S2 completes the connection to the switch element S2b, to reconnect the vehicle air bag deployment system to the piezoelectric element 7a.

Figure 1:
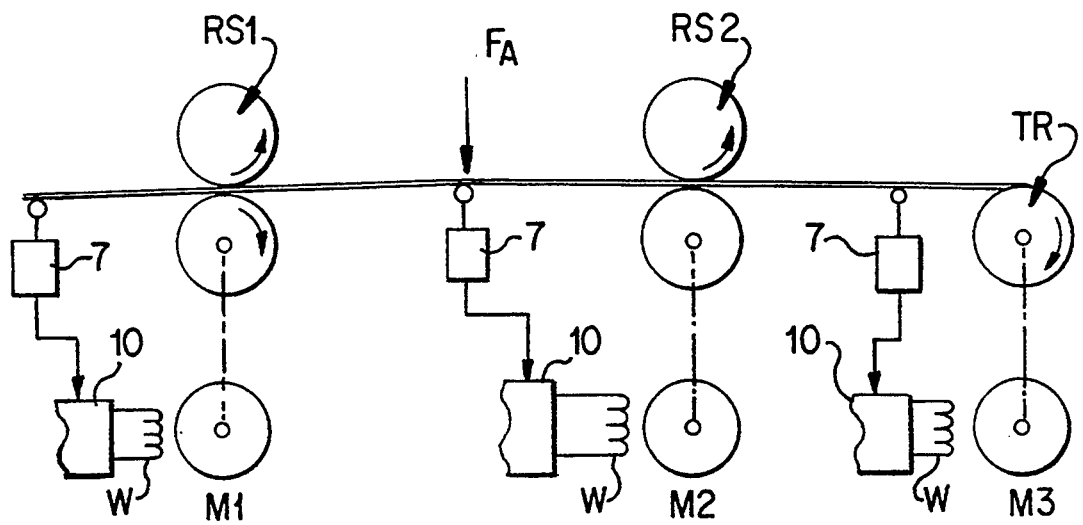
FIGS. 1, 2, and 3 are diagrammatic illustrations of prior art applications of force or acceleration transducers in physical systems for controlling some aspect of system activity.
Figure 2:
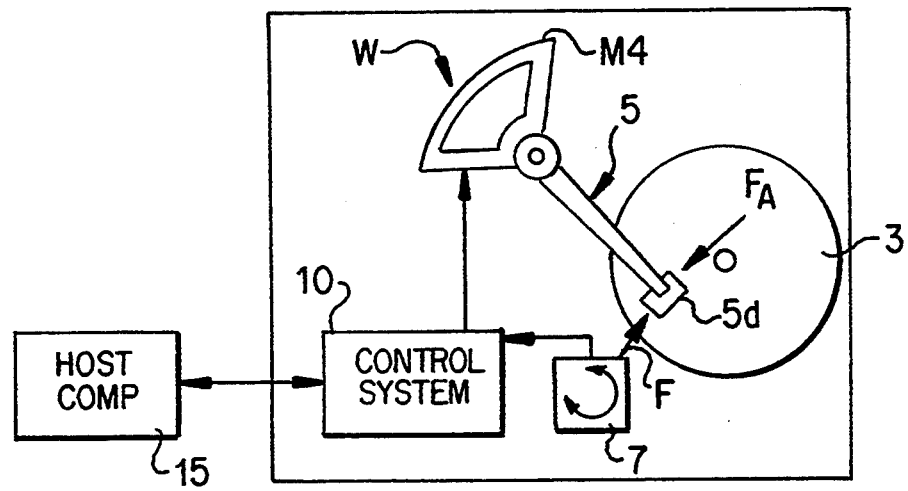
Figure 3:
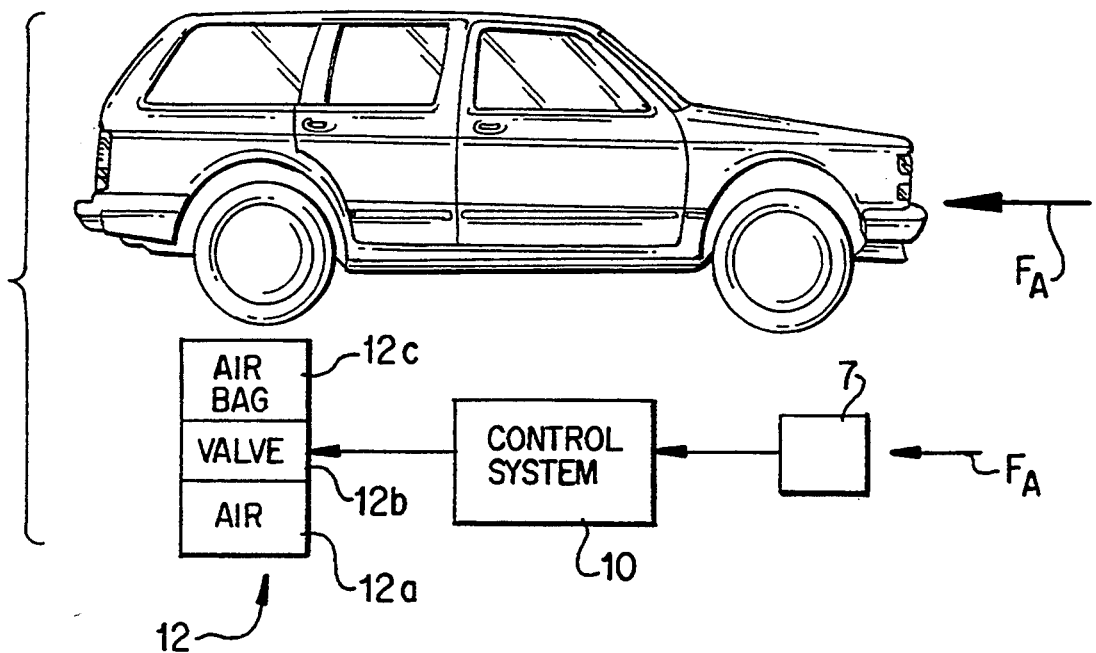
Figure 9:
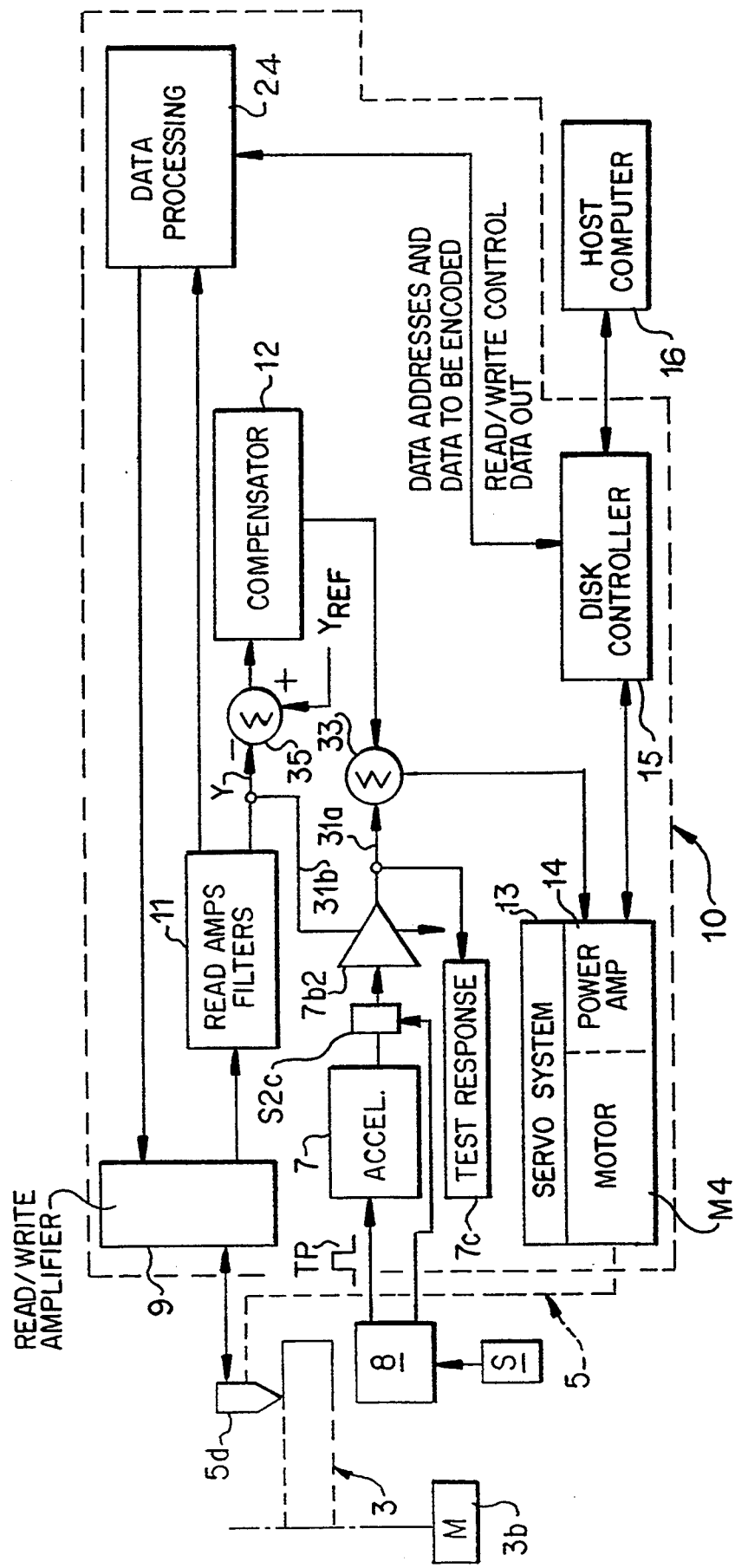
FIG. 9 illustrates the application of this invention in testing an accelerometer in a control system for controlling the actuator of a disk drive.

FIG. 9 illustrates the application of this piezoelectric testing system for testing the accelerometer in a control system, such as a servo control system in a disk drive of the type illustrated, for example, in FIG. 2. The servo control system is enclosed in dash line outline, bearing the reference numeral 10 to identify it with the control system 10 illustrated in FIG. 2. Other parts in this figure relating to those in FIG. 2 are correspondingly numbered. The servo control loop from the magnetic head 5d comprises a read/write amplifier 9, read amplifiers and filters 11 and a compensator circuit 12 which is coupled to a servo system 13. The servo system 13 comprises a power amplifier 14 to which the compensator is coupled. The power amplifier 14 controls a motor M4 which in turns powers the actuator 5, shown here as a dotted line coupled between the motor M4 and the magnetic head 5d. The overall control system 10 includes provision for reading and writing data which is in the tracks in the surface of the disk. Track seeking and track following in performing this function is under the control of a disk controller 15 which, responding to requests for information from a host computer 16, selects tracks and track sectors in which such information is found. Reading and writing with respect to selected tracks and track sectors is accomplished via a data processing unit 17 which is bi-directionally coupled to the disk controller, has an output circuit coupled to the read/write amplifiers a for data writing purposes and has an input circuit supplied by output from the read amplifiers 11 for receiving data which is read from a selected track and track sector of the disk. Bi-directional communication is provided between the disk controller 15 and the host computer 16 for the transfer of information.

An accelerometer 7 is coupled via a variable gain amplifier 7b2 into a summing junction 33 coupled between the compensator 12 and the power amplifier 14 in the servo system. The variable gain amplifier 7b2 is controlled by the output of the read amplifiers and filters 11. Thus, the gain adjustment of the accelerometer is controlled by the position error signal from the magnetic head 5d as it tracks the servo code on the disk. This calibrates the accelerometer in the servo loop and the calibrated accelerometer signal is coupled as a feed forward signal via the summing junction 33 in the servo feedback loop. As discussed hereinabove, the accelerometer 7 is a piezoelectric type of accelerometer, having a piezoelectric element such as illustrated in FIG. 6B. To simplify the illustration, only a switch element S2c between the accelerometer 7 and the amplifier 7b2, is illustrated in FIG. 9. The test pulse TP from the test pulse circuit 8 coupled to the accelerometer 7. The test pulse circuit 8 also produces a signal coupled to the switch S2c, also as seen in FIG. 6B, to interrupt the connection between the accelerometer and the input to the amplifier 7b2 during the interval of the test pulse TP. Although isolation switching between the amplifier 7b2 and the servo loop is not illustrated here, it will be appreciated that such isolation is provided as illustrated in FIG. 6B or FIG. 6A, if required. A switch S is provided to initiate the test cycle. Such a switch may be momentarily activated when the disk drive is to be operated and may be part of the power switching on the personal computer in which the disk drive is installed. Testing may be delayed until the system is on line and settled.

Figure 11:
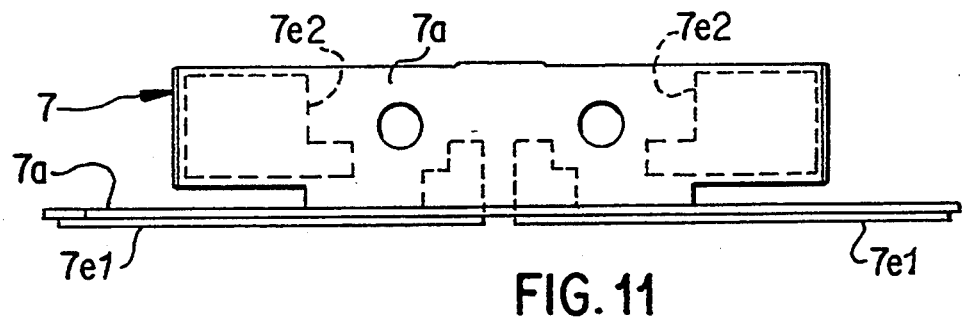
FIGS. 10, 11, and 12 are, respectively, perspective, plan and side views of a piezoelectric accelerometer of the type employed in the disk drive control system of FIG. 9.
Figure 12:
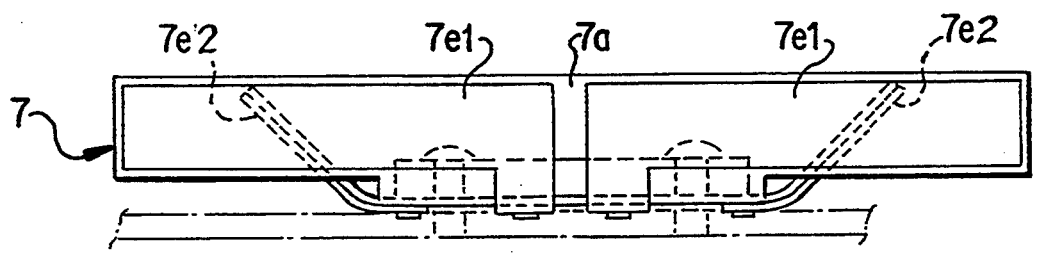
Figure 10:
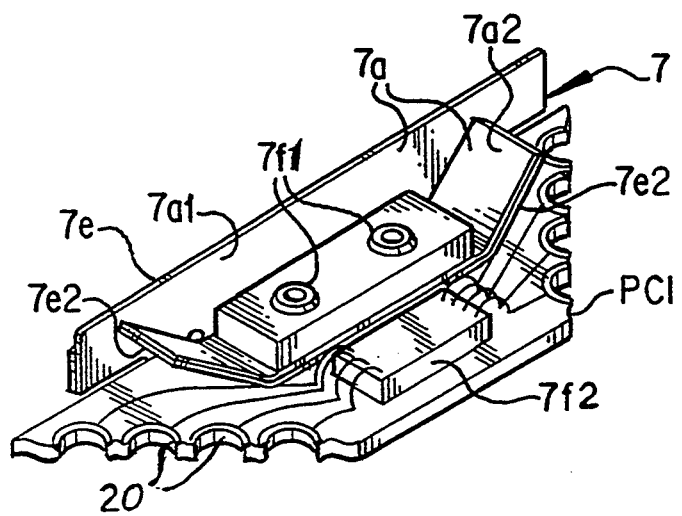

A piezoelectric accelerometer of the type applicable in sensing rotational acceleration of a disk drive, such as that seen in FIG. 2, which is a rotary actuator type of disk drive, is illustrated in FIGS. 10, 11 and 12. As seen in FIG. 10, the accelerometer is constructed of sheet material. The piezoelectric sheet element comprises a base portion having upturned Z axis sensor sections 7a2 on each end of the base portion and an upwardly turned Y axis sensor section 7a1, at the side of the base, which is integral with the base. Beryllium sheet electrodes 7e1, with tabs under the base, best seen in FIGS. 11 and 12, are bonded to the Y axis sensor section. Other beryllium electrodes 7e2 having contact pads turned under the base of the piezoelectric element are bonded to the Z axis sensor sections, as best seen in FIG. 11. Thus, four tabs of the electrodes are provided on the bottom side of the base of the piezoelectric element. The piezoelectric element is secured to a printed circuit board PC1 in the disk drive, by means of rivets, 7f1, seen in FIG. 10. Copper pads are provided on the printed circuit board in registration with the tabs of the electrodes of the piezoelectrical element. Ultrasonic bonding joins the tabs of the electrodes to these copper pads. A circuit chip 7f2 such a buffer amplifier, is provided with circuits coupled to the bonding pacs on the printed circuit board. This amplifier circuit buffers and amplifies the piezoelectric signal. The amplifier 7f2 is provided with electrical connections to solder holes 20 in the printed circuit board PC1. When installed in the disk drive, the base of the piezoelectric element is preferably perpendicular to the spindle axis of the rotary actuator.

Although specific implementations of this invention have been described herein it will be appreciated that other implementations may be employed embodying the described methods without departing from the spirit and scope of the teachings herein.

What is claimed is:

1. A test system for testing a force transducer installed in a physical system, comprising:
   a. a member to be controlled;
   b. a control system coupled to said member for controlling said member;
   c. a piezoelectric transducer in said physical system, said piezoelectric transducer having a piezoelectric element coupled in said control system for inserting the electrical output of said piezoelectric element into said control system to control said member;
   d. means in said physical system for mechanically deforming said piezoelectric element to produce said electrical output;
   e. a test signal circuit coupled to said piezoelectric element for momentarily applying the test signal and thereby electrically deforming said piezoelectric element, causing said piezoelectric element to mechanically ring upon removal of the test signal and produce a ringing electrical signal which characterizes the functional condition of said piezoelectric element;

f. a test response circuit responsive to said ringing electrical signal for determining the functionality of said piezoelectric element, and g. a switch member controlled by said test signal circuit for disconnecting said control system from said piezoelectric element during testing of said piezoelectric element.

2. A test system for testing a force transducer installed in a physical system, comprising:

a. a member to be controlled;

b. a control system coupled to said member for controlling said member;

c. a piezoelectric transducer in said physical system, said piezoelectric transducer having a piezoelectric element coupled in said control system for inserting the electrical output of said piezoelectric element into said control system to control said member;

d. means in said physical system for mechanically deforming said piezoelectric element to produce said electrical output;

e. a test signal circuit coupled to said piezoelectric element for momentarily applying the test signal and thereby electrically deforming said piezoelectric element, causing said piezoelectric element to mechanically ring upon removal of the test signal and produce a ringing electrical signal which characterizes the functional condition of said piezoelectric element;

f. a test response circuit responsive to said ringing electrical signal for determining the functionality of said piezoelectric element, and g. a first switch member coupled between said piezoelectric element and said test response circuit;

h. a second switch member coupled between said piezoelectric element and said control system;

i. a switch control circuit coupling said test signal circuit to said first switch member and to said second switch member for connecting said piezoelectric element to said test response circuit at said first switch member and disconnecting said piezoelectric element from said control system at said second switch member in response to testing of said piezoelectric element by said test signal circuit.

3. A test system for testing a force transducer installed in a physical system, comprising:

a. a member to be controlled;

b. a control system coupled to said member for controlling said member;

c. a piezoelectric transducer in said physical system, said piezoelectric transducer having a piezoelectric element coupled in said control system for inserting the electrical output of said piezoelectric element into said control system to control said member;

d. means in said physical system for mechanically deforming said piezoelectric element to produce said electrical output;

e. a test signal circuit coupled to said piezoelectric element for momentarily applying the test signal and thereby electrically deforming said piezoelectric element, causing said piezoelectric element to mechanically ring upon removal of the test signal and produce a ringing electrical signal which characterizes the functional condition of said piezoelectric element;

f. a test response circuit responsive to said ringing electrical signal for determining the functionality of said piezoelectric element, and g. an amplifier having an input circuit and having an output circuit, said output circuit being coupled to said control system and said test response circuit, and h. a switch member coupling said piezoelectric element to said input circuit of said amplifier and controlled by said test signal circuit for disconnecting said amplifier from said piezoelectric element for the duration of said momentary energization of said piezoelectric element by said test signal circuit.

4. A test system for testing a force transducer installed in a physical system, comprising:

a. a member to be controlled;

b. a control system coupled to said member for controlling said member;

c. a piezoelectric transducer in said physical system, said piezoelectric transducer having a piezoelectric element coupled in said control system for inserting the electrical output of said piezoelectric element into said control system to control said member;

d. means in said physical system for mechanically deforming said piezoelectric element to produce said electrical output;

e. a test signal circuit coupled to said piezoelectric element for momentarily applying the test signal and thereby electrically deforming said piezoelectric element, causing said piezoelectric element to mechanically ring upon removal of the test signal and produce a ringing electrical signal which characterizes the functional condition of said piezoelectric element;

f. a test response circuit responsive to said ringing electrical signal for determining the functionality of said piezoelectric element, and g. an amplifier having an output circuit and an input circuit;

h. a normally open first switch member coupled between said output circuit and said test response circuit;

i. a normally closed second switch member coupled between said output circuit and said control system;

j. a normally closed third switch member coupled between said piezoelectric element and said input circuit, and k. a switch control circuit coupling said test signal circuit to said first switch member, to said second switch member and to said third switch member for closing said first switch member and opening said second switch member for substantially the duration of said ringing signal and for opening said third switch member for the duration of said momentary energization of said of said piezoelectric element by said test signal circuit.

5. The test system according to claim 4, in which:

a. said amplifier has a bandwidth which is higher than the reciprocal of the mechanical damping time constant of the piezoelectric element.

6. The test system according to claim 4, in which:

a. said test signal circuit produces a test signal pulse;

b. said test system further comprises an electric pulse circuit responsive to said test signal pulse for producing an electrical pulse coupled to said piezoelectric element;

c. said switch control circuit comprises a timer circuit branch connected to said first switch member and to said second switch member and responsive to said test signal pulse for producing a switch control timing signal having a duration substantially the duration of said ringing electrical signal, and d. said switch control circuit comprises a second branch coupling said test signal to said third switch member to open said third switch member for substantially the duration of said timing signal to isolate said amplifier from said electrical pulse.

7. A test system for testing a force transducer installed in a physical system, comprising:

a. a member to be controlled;

b. a control system coupled to said member for controlling said member;

c. a piezoelectric transducer in said physical system, said piezoelectric transducer having a piezoelectric element coupled in said control system for inserting the electrical output of said piezoelectric element into said control system to control said member;

d. means in said physical system for mechanically deforming said piezoelectric element to produce said electrical output;

e. a test signal circuit coupled to said piezoelectric element for momentarily applying the test signal and thereby electrically deforming said piezoelectric element, causing said piezoelectric element to mechanically ring upon removal of the test signal and produce a ringing electrical signal which characterizes the functional condition of said piezoelectric element;

f. a test response circuit responsive to said ringing electrical signal for determining the functionality of said piezoelectric element, and g. said test response circuit comprises a reference electrical signal source for producing a reference electrical signal, and h. said test response circuit comprises a peak detector for receiving said ringing electrical signal and a comparator for differentially comparing the electrical output of said peak detector with said reference electrical signal.

8. The test system according to claim 7, in which:

a. said reference signal has a value which is substantially the nominal peak value of said ringing electrical signal.

9. A method for testing the piezoelectric element of a piezoelectric transducer comprising the steps of:

a. subjecting the piezoelectric element of said transducer to a voltage to induce mechanical strain in said element;

b. removing said voltage to permit said element to mechanically ring and produce a ringing electrical signal;

c. examining said ringing electrical signal by comparing said ringing electrical signal with a reference electrical signal indicative of a desired functionality of said piezoelectric transducer, and d. said reference signal being an empirically measured nominal peak value of voltage of the ringing electrical signal of a functional piezoelectric element.

10. An air bag system for protecting an occupant of a vehicle, comprising:

a. a deflated air bag on said vehicle;

b. an air supply on said vehicle;

c. a normally closed valve coupling said air supply to said air bag for inflating said air bag when said valve is opened;

d. a piezoelectric accelerometer on said vehicle to respond to components of acceleration acting longitudinally of said vehicle, at and above a predetermined level of acceleration e. valve control means coupling said piezoelectric element to said valve to operate said valve to inflate said air bag in the presence of acceleration of said vehicle at and above said predetermined level of acceleration;

f. a switch on said vehicle;

g. a test circuit responsive to operation of said switch for coupling a voltage pulse to said piezoelectric element of said accelerometer to cause said piezoelectric element to mechanically ring and to produce a ringing electrical signal;

h. response circuit means coupled to said piezoelectric element to respond to said ringing electrical signal and provide a response indicative of the functionality of said piezoelectric element, and i. means responsive to operation of said test circuit to test said piezoelectric element for disabling said valve control means to prevent operation of said valve during testing of said piezoelectric element.

11. A disk drive, comprising:

a. at least one rotatably mounted disk having a surface containing radially spaced tracks;

b. a motor for rotating said at least one disk at substantially constant speed;

c. a transducer for sensing tracks;

d. a movable actuator for moving said transducer to different radial locations with respect to the surface of said at least one disk;

e. an actuator motor for moving said movable actuator;

f. an actuator motor control system coupled to said actuator for moving said actuator to position said transducer at a selected track on said surface of said at least one disk;

g. a piezoelectric accelerometer on said disk drive responsive to acceleration of said disk drive which causes relative displacement between said transducer and said tracks, for additionally controlling said control system to oppose such relative displacement, said piezoelectric accelerometer having a force sensitive piezoelectric element;

h. a test system coupled to said piezoelectric element for momentarily energizing and thereby mechanically stressing and deforming said piezoelectric element causing it to mechanically ring upon termination of momentary energization, mechanical ringing of said piezoelectric element producing a ringing electrical signal which characterizes the functionality of said piezoelectric element, and i. a response circuit coupled to said piezoelectric element for comparing a peak value of said ringing electric signal with a reference signal for obtaining a response representing the functionality of said piezoelectric element.

* * * * *